US007680377B2

(12) United States Patent
Jacobsen et al.

(10) Patent No.: US 7,680,377 B2
(45) **Date of Patent: *Mar. 16, 2010**

(54) ULTRA-HIGH DENSITY CONNECTOR

(75) Inventors: Stephen C. Jacobsen, Salt Lake City, UT (US); David P. Marceau, Salt Lake City, UT (US); Shayne M. Zurn, Salt Lake City, UT (US); David T. Markus, Salt Lake City, UT (US)

(73) Assignee: Raytheon Sarcos, LLC, Waltham, MA (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/070,580

(22) Filed: Feb. 19, 2008

(65) Prior Publication Data

US 2008/0205829 A1 Aug. 28, 2008

Related U.S. Application Data

(63) Continuation of application No. 11/637,509, filed on Dec. 11, 2006, now Pat. No. 7,333,699.

(60) Provisional application No. 60/749,777, filed on Dec. 12, 2005, provisional application No. 60/749,873, filed on Dec. 12, 2005.

(51) Int. Cl.

| | |
|---|---|
| ***G02B 6/04*** | (2006.01) |
| ***H01R 12/00*** | (2006.01) |
| ***H01R 13/648*** | (2006.01) |
| ***H01R 12/24*** | (2006.01) |
| ***H01R 33/945*** | (2006.01) |
| ***H01R 33/00*** | (2006.01) |
| ***C03B 37/15*** | (2006.01) |
| ***G02B 6/36*** | (2006.01) |
| ***G02B 6/38*** | (2006.01) |
| ***G02B 6/40*** | (2006.01) |
| ***G02B 6/44*** | (2006.01) |

(52) U.S. Cl. ......................... 385/115; 385/71; 385/101; 385/121; 385/53; 385/54; 385/55; 385/56; 385/59; 385/67; 385/74; 439/62; 439/65; 439/66; 439/67; 439/74; 439/79; 439/100; 439/108; 439/493; 439/577; 439/608; 439/660; 65/409

(58) Field of Classification Search ................. 385/101, 385/115, 121, 53, 54, 55, 56, 59, 71; 439/577, 439/62, 65–67, 74, 77, 79, 100, 108, 493, 439/608, 660; 65/409

See application file for complete search history.

(56) References Cited

U.S. PATENT DOCUMENTS 3,337,838 A 8/1967 Damiano et al.

(Continued)

FOREIGN PATENT DOCUMENTS

| | | |
|---|---|---|
| GB | 2039421 | 8/1980 |
| JP | 2004237077 | 8/2004 |

OTHER PUBLICATIONS

Brunsting et al. "Enhanced optical performance for small form factor LC connectors": Panduit Corp., pp. 1-5.

(Continued)

*Primary Examiner*—Brian M. Healy
*Assistant Examiner*—Hung Lam
(74) *Attorney, Agent, or Firm*—Thorpe North & Western LLP

(57) ABSTRACT

Techniques for ultra-high density connection are disclosed. In one embodiment, an ultra-high density connector includes a bundle of substantially parallel elongate cylindrical elements, where each cylindrical element is substantially in contact with at least one adjacent cylindrical element. Ends of the elongate cylindrical elements are disposed differentially with respect to each other to define a three-dimensional interdigitating mating surface. At least one of the elongate cylindrical elements has an electrically conductive contact positioned to tangentially engage a corresponding electrical contact of a mating connector.

25 Claims, 5 Drawing Sheets

U.S. PATENT DOCUMENTS

| | | | | |
|---|---|---|---|---|
| 3,601,759 | A * | 8/1971 | Barker | 439/262 |
| 4,132,461 | A | 1/1979 | Jacques et al. | |
| 4,203,650 | A | 5/1980 | Millet et al. | |
| 4,369,104 | A | 1/1983 | Beckley | |
| 5,270,485 | A | 12/1993 | Jacobsen | |
| 5,599,615 | A | 2/1997 | Swift et al. | |
| 5,610,747 | A | 3/1997 | Jacobsen | |
| 5,861,662 | A | 1/1999 | Candelore | |
| 6,020,747 | A | 2/2000 | Bahns et al. | |
| 6,110,354 | A | 8/2000 | Saban et al. | |
| 6,128,527 | A | 10/2000 | Howard, III et al. | |
| 6,289,187 | B1 | 9/2001 | Swift et al. | |
| 6,330,466 | B1 | 12/2001 | Hofmann et al. | |
| 6,334,856 | B1 | 1/2002 | Allen et al. | |
| 6,444,102 | B1 | 9/2002 | Tucci et al. | |
| 6,462,398 | B1 | 10/2002 | Jojiki | |
| 6,515,346 | B1 | 2/2003 | Kemeny | |
| 6,740,214 | B1 | 5/2004 | Dobson et al. | |
| 6,794,984 | B2 | 9/2004 | Komatsu | |
| 6,829,498 | B2 | 12/2004 | Kipke et al. | |
| 6,851,980 | B2 * | 2/2005 | Nelson et al. | 439/608 |
| 6,892,438 | B1 | 5/2005 | Hill et al. | |
| 6,924,439 | B1 | 8/2005 | Bonni et al. | |
| 6,946,851 | B2 | 9/2005 | Lee et al. | |
| 6,953,347 | B2 | 10/2005 | McGrath et al. | |
| 6,993,392 | B2 | 1/2006 | Nicolelis et al. | |
| 7,010,356 | B2 * | 3/2006 | Jog et al. | 607/116 |
| 7,333,699 | B2 | 2/2008 | Jacobsen et al. | |
| 2004/0080056 | A1 | 4/2004 | Lim et al. | |
| 2004/0125515 | A1 | 7/2004 | Popovich | |
| 2005/0029009 | A1 | 2/2005 | Swift et al. | |
| 2005/0029649 | A1 | 2/2005 | Kuzawinski et al. | |
| 2005/0143790 | A1 | 6/2005 | Kipke | |
| 2005/0159028 | A1 | 7/2005 | Sweetland et al. | |
| 2005/0202695 | A1 | 9/2005 | Sweetland et al. | |
| 2005/0230795 | A1 | 10/2005 | Furuyama et al. | |
| 2006/0039660 | A1 | 2/2006 | Henze et al. | |
| 2007/0142714 | A1 | 6/2007 | Shumate | |

OTHER PUBLICATIONS

Hayes, Jim "Connector types and terminology": Power and Integrated Building Systems, Editorial, pp. 1-2.

Allan, "Twist-pin concept increases miniature connector reliability" Electronic Design, The authority on emerging technologies for desing solutions freescale.com pp. 1-2.

Bell, "Carpenter breaks barrier with nano-miniature connector specification", Mar. 9, 2005, pp. 1-3. Columbus Federal Voice.

Z-Axis Connector Company "Miniature Electronic Connectors": pp. 1-11.

Glenair MIL-DTL-32139 Nanominiature Connectors "Single row metal shell pigtails (M32139.01 & 02)": www.glenair.com, 2005, pp. 1-2.

Nano Line—NJS Microminiature, ITT Industries, www.ittcannon.com, p. L-14.

Nano Line—Strip-NT Microminiature, ITT Industries, www.ittcannon.com, p. L-15.

"LSI Announces Wire-Bond Advance" pp. 1-2.

Brunner et at., "Advanced wire bond looping technology for emerging packages", SEMI Technical Symposium; Innovations in Semiconductor Manufacturing, 2004, pp. 1-8.

Karnezos et al. 3D Packaging Promises Perfomance, reliability Gains with Small Footprints and Lower Porfiles, www.cipscalereview.com, Feb. 2005, pp. 1-6.

Chylak et al. "Overcoming the key barriers in 35 umPitch wire bond packaging: probe, mold, and substrate solutions and trade-offs" SEMI/IEEE, 2002, pp. 1-6.

ESEC "25um fine pitch solution", 2002, pp. 1-3.

ASE Kaohsiung, "CSP Leadless LGA", pp. 1-5.

Patterson, William et al. "A microelectrode/microelectronic hybrid device for brain implantable neuroprosthesis applications"; IEEE, Oct. 2004, pp. 1845-1853, vol. 51, No. 10.

Normann, "Sight restoration for individuals with profound blindness", www.bioen.utah.edu/cni/projects/blindess.htm, Sep. 21, 2005, pp. 1-21.

Jacobsen, et al., U.S. Appl. No. 11/637,380, filed Dec. 11, 2006.

Jacobsen, et al., U.S. Appl. No. 11/637,508, field Dec. 11, 2006.

Jacobsen, U.S Appl. No. 12/368,919, filed Feb. 10, 2009.

* cited by examiner

ULTRA-HIGH DENSITY CONNECTOR

This application is a continuation of U.S. patent application Ser. No. 11/637,509, entitled "Ultra-High Density Electrical Connector", filed Dec. 11, 2006 now U.S. Pat. No. 7,333,699, which claims the benefit of U.S. Provisional Patent Application Ser. No. 60/749,777, filed Dec. 12, 2005, entitled "Ultra-High Density Electrical Connector" and U.S. Provisional Patent Application Ser. No. 60/749,873, filed Dec. 12, 2005, entitled "Multi-Element Probe Array," each of which is incorporated by reference herein.

BACKGROUND OF THE INVENTION AND RELATED ART

Electronic systems are ubiquitous today, and electronic systems often require a variety of electrical connectors. Many different types of electrical interconnection are used, for example, cable to cable, cable to circuit board, circuit board to circuit board, integrated circuit package to circuit board, semiconductor die to integrated circuit package. Techniques for creating electrical interconnections vary depending on the situation, and include pin and socket connectors, card edge connectors, splices, elastomeric connectors, etc. Some connections are permanent and others temporary, allowing plugging together and unplugging a mating pair of connectors.

Across many different electrical interconnection techniques, a common desire to achieve high density interconnection appears. With the prevalence of miniaturized electronics, such as cell phone, personal digital assistants, and the like, the need for high density interconnection is great.

Referring to connector mating pairs in more detail, various formats of connectors are known which can be plugged together and unplugged. For example, a well-known 9-pin miniature circular connector is used for interconnection between a personal computer and peripherals such as a keyboard or mouse. Many common connectors are constructed from a plastic or rubber housing into which stamped metal contacts are placed. Pins are provided on one connector, and sockets on the mating connector, such that the pins plug or slide into the sockets when the connectors are mated. Connector contacts can be arranged in rows or circular patterns and are held within the housing various techniques. Some higher quality connectors use machined contacts and ceramic bodies to provide increased precision.

The state of the art in mateable connectors is demonstrated by so-called "nano-miniature" connectors which provide contact spacing of about 0.025 inch. Such spacing can theoretically provide interconnect density of up to 1600 connections per square inch, although typical connectors provide only one or two rows of contacts and under 100 contacts total. More common are so-called "micro-miniature" connectors with contact spacing of about 0.05 inch to 0.1 inch, providing theoretical interconnect density of a few hundred connections per square inch. In practice, however, housings included in such connectors result in actual connection density considerably below these theoretical values. Although common 32 AWG wires are about 0.008 inch (about 200 micrometer) in diameter (excluding insulation), the connector technology is relatively large compared to the wires. Even smaller wires are available. Connection of wires to these connectors is typically performed by crimping, clamping, insulation displacement blades, or soldering. Placing connectors onto a wire bundle can be a tedious and expensive manufacturing processing.

In some applications, there is also a need to include other types of connections, such as fluid or optical connections in additional to electrical connections. Few techniques for making both electrical and other types of connections simultaneously are known.

SUMMARY OF THE INVENTION

The present invention includes ultra-high density connectors which help to overcome problems and deficiencies inherent in the prior art.

In accordance with the invention as embodied and broadly described herein, an ultra-high density connector can be used for a variety of applications. An ultra-high density electrical connector includes a bundle of substantially parallel elongate cylindrical elements. Each of the cylindrical elements is substantially in contact with at least one adjacent cylindrical element. The ends of the elongate cylindrical elements are disposed differentially with respect to each other to define a three-dimensional interdigitating mating surface. Electrical contacts are disposed on one or more of the elongate cylindrical elements in a position to tangentially engage a corresponding electrical contact of a mating connector.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
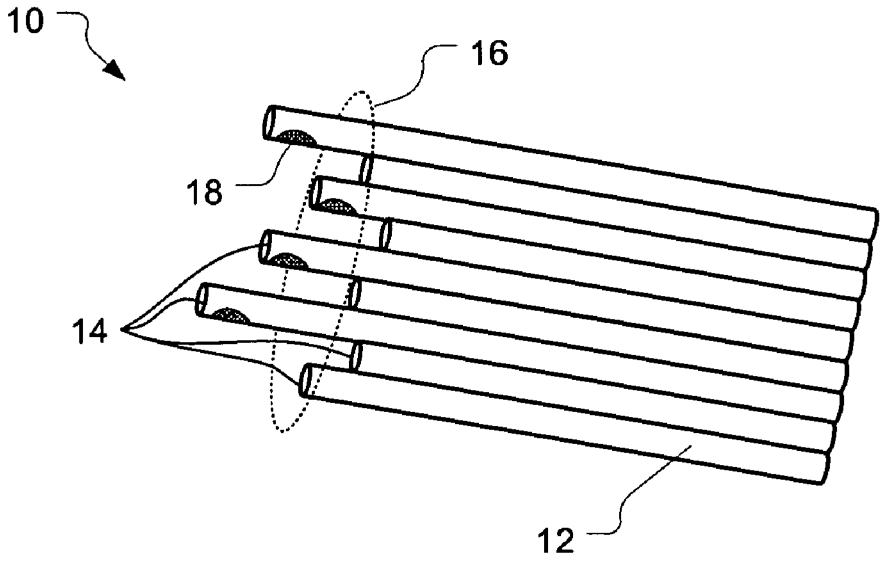
FIG. 1 illustrates a perspective view of an ultra-high density electrical connector in accordance with an embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

In describing the present invention, the following terminology will be used.

The singular forms "a," "an," and "the" include plural referents unless the context clearly dictates otherwise. Thus, for example, reference to a microfilament includes reference to one or more microfilament.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In general, the present invention is directed towards an ultra-high density connector system. The connector can be constructing using a bundle of substantially parallel micro filaments, where individual microfilaments can serve a variety of functions, including for example contacts, spacers, key elements, supporting structure, protective elements, etc.

With reference to FIG. 1, shown is an illustration of an ultra-high density electrical connector according to a first exemplary embodiment of the present invention. Specifically, FIG. 1 illustrates the ultra-high density electrical connector, shown generally at 10, as including a bundle of substantially parallel elongate cylindrical elements 12. As used herein, cylindrical includes any prismatic structure, by which is meant a structure having a uniform cross section taken along any part of the element. Cylindrical also includes elongate structures having a non-uniform cross section. Various examples of elongate cylindrical elements are described herein.

Figure 2:
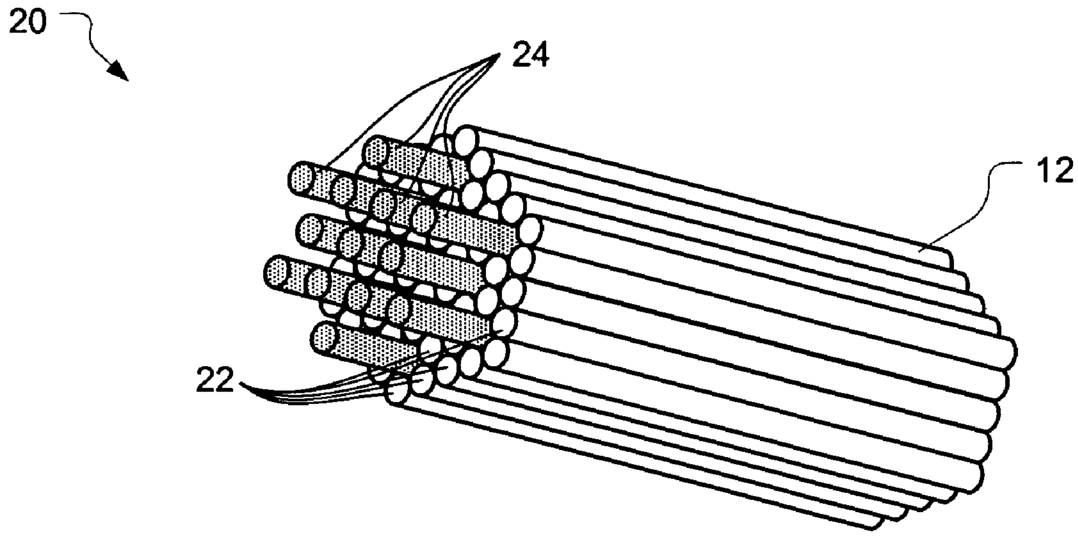
FIG. 2 illustrates a perspective view of an alternate arrangement of an ultra-high density electrical connector in accordance with an embodiment of the present invention.

As can be seen, each cylindrical element is touching at least one adjacent cylindrical element. For example, the bundle can be a one-dimensional linear arrangement of elongate cylindrical elements as shown in FIG. 1, or can be a two-dimensional arrangement as shown in FIG. 2, or various other arrangements as discussed further herein.

Referring to FIG. 1, the ends 14 of the elongate cylindrical elements are disposed differentially with respect to each other to define a three-dimensional interdigitating mating surface 16. At least one of the elongate cylindrical elements 12 has an electrically conductive contact 18 positioned to tangentially engage a corresponding electrical contact of a mating connector. For example, the electrically conductive contact can be positioned on a side of an elongate cylindrical element so that it slides into tangential contact with a corresponding electrically conductive contact of the mating connector as discussed in further detail below. In general, tangential contact includes any lateral contact by adjacent elements, such as the sliding contact between lateral surfaces as shown.

The elongate cylindrical elements 12 of the ultra-high density electrical connector 10 can be held together in a variety of ways. For example, the elongate cylindrical elements can be bonded together by a bonding material (not shown) disposed on the outer surface of the elongate cylindrical element. By bonding the elongate cylindrical elements together, the electrical connector can be constructed without a housing. This can help to reduce the overall size of the electrical connector. As another example, the elongate cylindrical elements can be held together by inserting the bundle into a ferule or housing structure (not shown). As yet another example, outermost elongate cylindrical elements can serve as a sheath for the connector.

Figure 3:
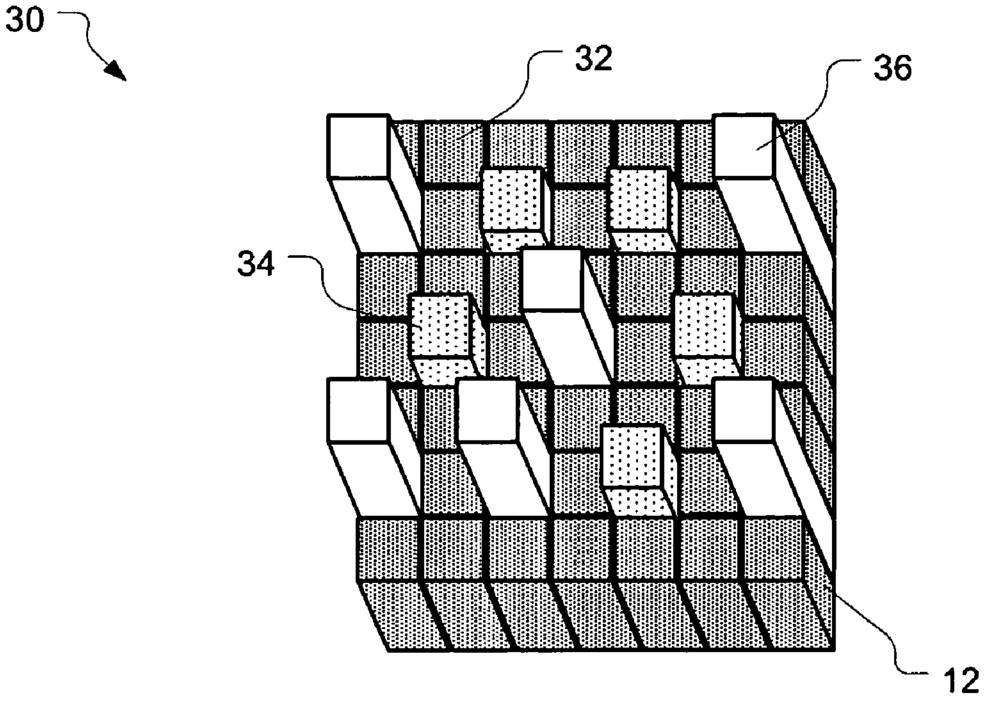
FIG. 3 illustrates a perspective view of another alternate arrangement of an ultra-high density electrical connector in accordance with an embodiment of the present invention.

The elongate cylindrical elements of an ultra-high density electrical connector can be arranged in various ways. For example, as illustrated in FIG. 1, the elongate cylindrical elements 12 can be arranged substantially in a planar arrangement. FIG. 2 illustrates an alternate arrangement of an ultra-high density electrical connector 20, where the elongate cylindrical elements 12 are arranged in a hexagonal close pack. FIG. 3 illustrates yet another alternate arrangement of an ultra-high density electrical connector 30, where the elongate cylindrical elements 12 are arranged in a square arrangement.

It will be appreciated that the elongate cylindrical elements can have a variety of different cross-sections, including for example round, oval, triangular, square, rectangular, pentagonal, hexagonal, and in general polygonal cross-section. It is not essential that the elongate cylindrical elements have a constant cross-section; the cross-section can be variable. For example, a particular geometry can be micro-machined onto the elongate cylindrical elements before assembly of the ultra-high density electrical connector. The elongate cylindrical elements can also have a bore, making them in a tubular configuration. Additionally, the elongate cylindrical elements can have cross sectional shapes that are similar to or different from each other.

Various types of elongate cylindrical elements can be used in embodiments of the present invention. For example, the elongate cylindrical elements can be a filamentary structure such as a microwire, insulated microwire, glass fiber, silicon fiber, and the like. A mixture of different types of filamentary structures can be used, including for example filamentary structures of different cross-section geometry, different composition, or both. For example, various ways are known to draw a glass fiber having a desired cross section. Some of the elongate cylindrical elements can be high strength materials, such as an aramid fiber, to help provide strength to the bundle.

As a more specific example, with reference to FIG. 2, a first subset 22 of the elongate cylindrical elements can comprise an electrically insulating material, and a second subset 24 of the elongate cylindrical elements can comprises an electrically conductive material. For example, glass fibers can be used for the first subset and metal rods or microwires used for the second subset.

Note that microwires can be used for both the ultra-high density connector and the wire bundle to be interconnected. In other words, the connector can be an integral part of an interconnecting cable, by using the wires within the cable as some of the elongate cylindrical elements of the connector. This provides a benefit in reducing the need to provide a connection between the wires and a separate connector element as is the case in known connectors.

Turning to the three-dimensional interdigitating mating surface 16 in further detail, it will be appreciated that the mating surface can take on various forms, including for example, an irregular arrangement as illustrated in FIG. 1. As shown in FIG. 2, the interdigitating mating surface can be defined by the ends of the elongate cylindrical elements where a first subset 22 of the elongate cylindrical elements have ends positioned in substantially a first plane, and a second subset 24 of the elongate cylindrical elements have ends positioned substantially in a second plane. As another example, groups of the elongate cylindrical elements can have their ends at different positions, for example as shown in FIG. 3, where three groups 32, 34, 36 of elongate cylindrical elements having displaced ends are shown. In general, elongate cylindrical elements can be displaced forward or rearward relative to other elongate cylindrical elements to define keying elements.

The elongate cylindrical elements having electrically conductive contacts can be referred to as active elements, and the remaining elongate cylindrical elements can be referred to as spacer elements. In one embodiment, all of the active elements can have their ends in a first plane, and all of the spacer elements can have their ends in a second plane, different from the first plane, for example as illustrated in FIG. 2. As another embodiment, all of the active elements can have their ends in a first plane, and the spacer elements disposed at a variety of different longitudinal positions relative to the active elements and each other. As yet another embodiment, all of the spacer elements can have their ends in a second plane, and the active elements disposed at a variety of different longitudinal positions relative to the active elements and each other, for example as illustrated in FIG. 3. Finally, as yet another embodiment, the active and spacer elements can be disposed at a variety of different longitudinal positions relative to each other as illustrated in FIG. 1. In other words, the three-dimensional interdigitating mating surfaces can be defined primarily by the active elements, the spacer elements, or both the active and spacer elements. Other variations in the arrangements of the ends of the elongate cylindrical elements can also be used.

Figure 4:
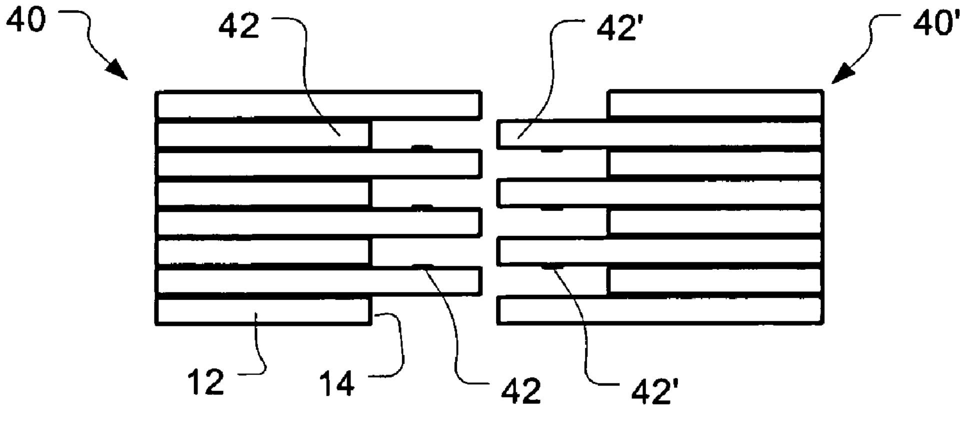
FIG. 4 illustrates a side view of a pair of mating ultra-high density electrical connectors in accordance with an embodiment of the present invention.

Turning to the mating aspects and electrical contacts in further detail, FIG. 4 illustrates a pair of mating ultra-high density electrical connectors 40, 40'. It can be seen that the differentially positioned ends 14 of the connectors are arranged in a complementary fashion for the corresponding ends 42, 42' of the mating pair. Corresponding electrical contacts 44, 44' are arranged to tangentially engage each other. Positioning the electrical contacts on the side of elongate cylindrical elements 12 provides several benefits. First, because the contacts are on the side of the elongate cylindrical element, a wiping action is providing during engagement of the connectors, helping to remove oxide layers which can form on some types of electrically conductive material. This wiping action helps to reduce electrical resistance between the complementary engaging contacts. Second, because the contacts are on the side, reliable electrical contact is made even if the connectors are not fully engaged or become partially disengaged. Third, the thickness of the electrical contacts and/or diameter of the elongate cylindrical elements can be selected to provide mechanical interference between the corresponding ends of the mating pair, in turn providing an engineered amount of insertion/removal force and contact pressure. These factors help to provide reliable electrical conductivity through contact pairs of the ultra-high density electrical connector.

As shown in FIG. 4, the contacts 42, 42' include electrically conductive regions disposed on the side of corresponding elongate cylindrical elements. The electrically conductive regions can be, for example, a patch of metal. Various configurations for the electrically conductive regions can be used, as illustrated in FIGS. 5(*a*) and 5(*b*). For example, the electrically conductive region can be in the form of one or more conductive strips 52 extending along the length of the corresponding elongate cylindrical element, and conductive rings 54 or partial rings 56 disposed substantially around an outer surface of the corresponding elongate cylindrical element.

Figure 5A:
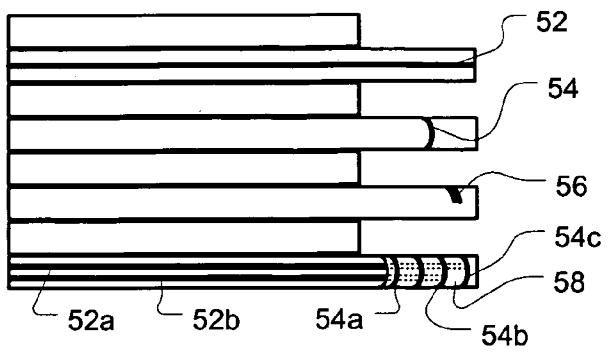
FIGS. 5*a* and 5*b* illustrates a side view and end view, respectively, of a variety of electrically conductive contact arrangements in accordance with an embodiment of the present invention.
Figure 5B:
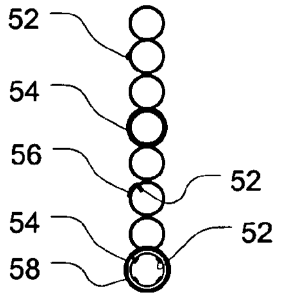

Multiple electrical connections can be carried on a single cylindrical element. For example, as shown in FIGS. 5*a* and 5*b*, multiple conductive strips 52*a*, 52*b* can be deposited on the outer surface of a cylindrical element. Separate electrical connections for the conductive strips can be formed at the end of the cylindrical elements. For example, an insulating material 58 may be placed over the conductive strips and portions of the insulating material etched away to expose a small portion of the conductive strips. Conductive rings 54*a*, 54*b*, 54*c* can then be deposited over the insulating material, making connection to corresponding conductive strips through the etched portion of the insulating material.

Note that a mating pair of contacts need not have the same geometry. For example, a conductive strip 52 can interface with a conductive ring 56. Furthermore, contacts can be placed at a variety of different positions or orientations on the elongate cylindrical elements provided that mating contacts will tangentially engage. For example, an active element can include more than one contact. As another option, the conductive region can be provided by the surface of the corresponding elongate cylindrical element itself, for example, where the elongate cylindrical element is a conductive material.

Figure 6A:
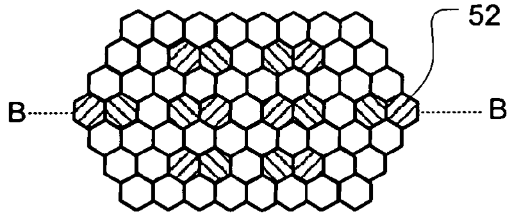
FIGS. 6*a* and 6*b* illustrate cross-section views of a pair of mated ultra-high density electrical connectors in accordance with an embodiment of the present invention.
Figure 6B:
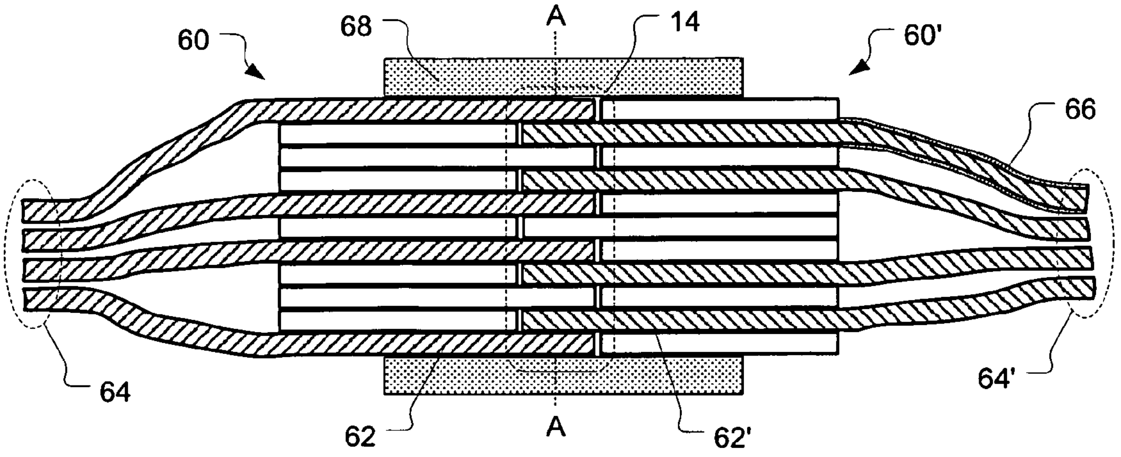

FIGS. 6*a* and 6*b* illustrate cross-sectional views of a pair of mated ultra-high density electrical connectors 60, 60' in a wire-to-wire connection, connecting two wire bundles 64, 64', in accordance with an embodiment of the present invention. FIG. 6*a* is a cross section taken through the mating surface on line A-A of FIG. 6*b*, and FIG. 6*b* is a cross section taken on line B-B of FIG. 6*a*. The connectors meet at the three-dimensional interdigitating mating surface 14. Electrically conductive contacts are provided by the electrically conductive microwires 62, 62' which are integral to the wire bundles 64, 64'. The microwires may have insulation 66 which is removed at the ends near the mating surface during forming of the ultra-high density connector. By using the microwire as part of the connector and the electrical contact itself, the need to solder, crimp, clamp, or otherwise bond the microwire to a separate electrical contact in the connector is eliminated. This can help to improve the reliability and manufacturability of the ultra-high density connector over the prior art. Alternately, microwires can be bonded to the elongate cylindrical elements, for example, by soldering, diffusion bonding, ultrasonic bonding, conductive epoxy, and similar techniques.

The sheath 68 may be clamped around the mated connectors to help press the contacts together and provide a reliable connection. The sheath can be a clamp, wrap around, thermo-tightening sleeve, or similar arrangement. The spacer elements can be an elastic material, so that when clamped, pressure is maintained on the electrical contacts.

As will now be appreciated, an ultra-high density connector in accordance with the present invention can provide extremely high-density interconnection. For example, 32 AWG wire has a diameter of about 0.008 inch (200 micrometer) excluding insulation. Finer wires are available, however, including insulated wires (e.g., magnet wire) as small at 60 AWG (about 0.0003 inch or 8 micrometer diameter). Such very small wires are highly desirable in applications where space is a premium, such as miniaturized electronics. As another example, some biomedical applications require wires to be threaded through parts of the body. Connectors having comparably small scale can be achieved using embodiments of the present invention.

For example, the elongate cylindrical elements can have a diameter of about 0.008 inch or less (about 0.2 millimeter or less). Using a contact arrangement as illustrated in FIG. 6, the contact spacing is about 0.016 to 0.024 inch (about 0.4 to 0.6 millimeter). Contact density of about 2,600 connections per square inch (about 400 per square centimeter) can thus be achieved. Of course, larger or smaller diameters can be used, resulting in corresponding changes in the density achieved. For example, for elongate cylindrical elements having a diameter of about 0.001 inch (about 25 micrometer), connection density on the order of about 100,000 per square inch (about 15,500 per square centimeter) are possible, orders of magnitude better than most conventional connectors.

Figure 7:
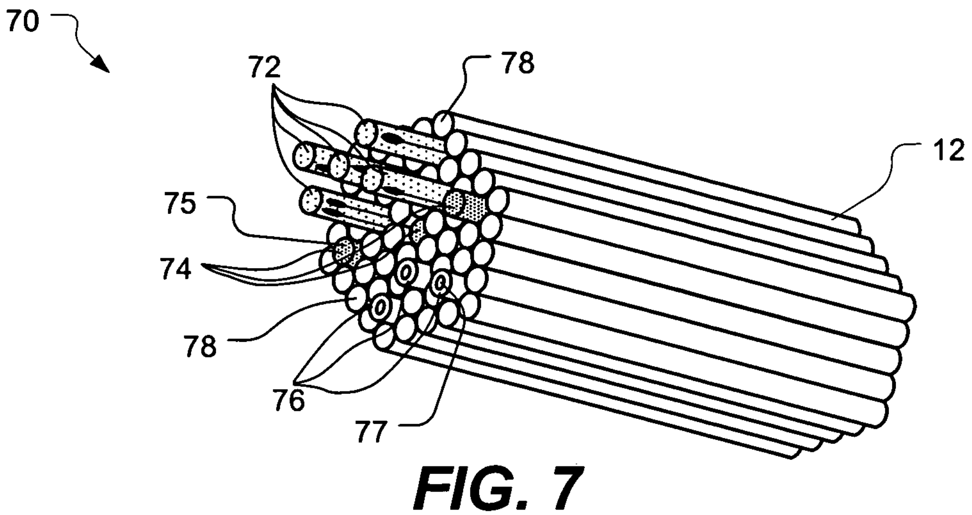
FIG. 7 illustrates a perspective view of an ultra-high density hybrid connector in accordance with an embodiment of the present invention.

Although the foregoing discussion has focused primarily on electrical connections, embodiments of the present invention are not limited to just electrical connectors. Hybrid connectors are also possible. For example, as discussed above, the elongate cylindrical elements can be glass fibers or tubes. FIG. 7 illustrates a hybrid connector 70 having a mixture of different contact types in accordance with an embodiment of the present invention. A first 72 group of microfilaments is configured for electrical communication, a second 74 group is configured for optical communication, and a third 76 group is configured for fluid communication. For example, as discussed above, the first group can include electrically conductive strips along the length of the microfilaments, or the first group can include electrically conductive microfilaments. The second group can be optical fibers 75 or elongate cylindrical elements having an optical waveguide microfabricated thereon. The third group can be tubular elements providing a fluid communication channel through a bore 77. Connectors can include various combinations of electrical, optical, and/or fluid communication elements. As will be appreciated, optical and fluid communication elements can be positioned so that they butt head on when a pair of complementary connectors is mated. Spacer elements 78 can also be included in the connector.

Considering the hybrid connector 70 in more detail, spacer elements 78 can be selected to provide various functions. For example, as noted above, elastic spacer elements can be used to help maintain contact pressure on electrical elements 72 when mated connectors are clamped. As another example, spacer elements can be positioned around fluid communication elements 76 to function as a sealing gasket.

Electronic circuitry may be built into the connector as will now be described. Electronic circuitry can be microfabricated onto an elongate cylindrical element using cylindrical lithography, for example as described in commonly-owned U.S. Pat. Nos. 5,106,455, 5,269,882, and 5,273,622 to Jacobsen et al., herein incorporated by reference. Accordingly, a connector can include circuitry to monitor the integrity of the connector, such as a thermocouple, moisture sensor, or the like. Information from the electronic circuitry can be communicated via electrical or optical signals along elements within the bundle dedicated to that purpose.

Figure 8:
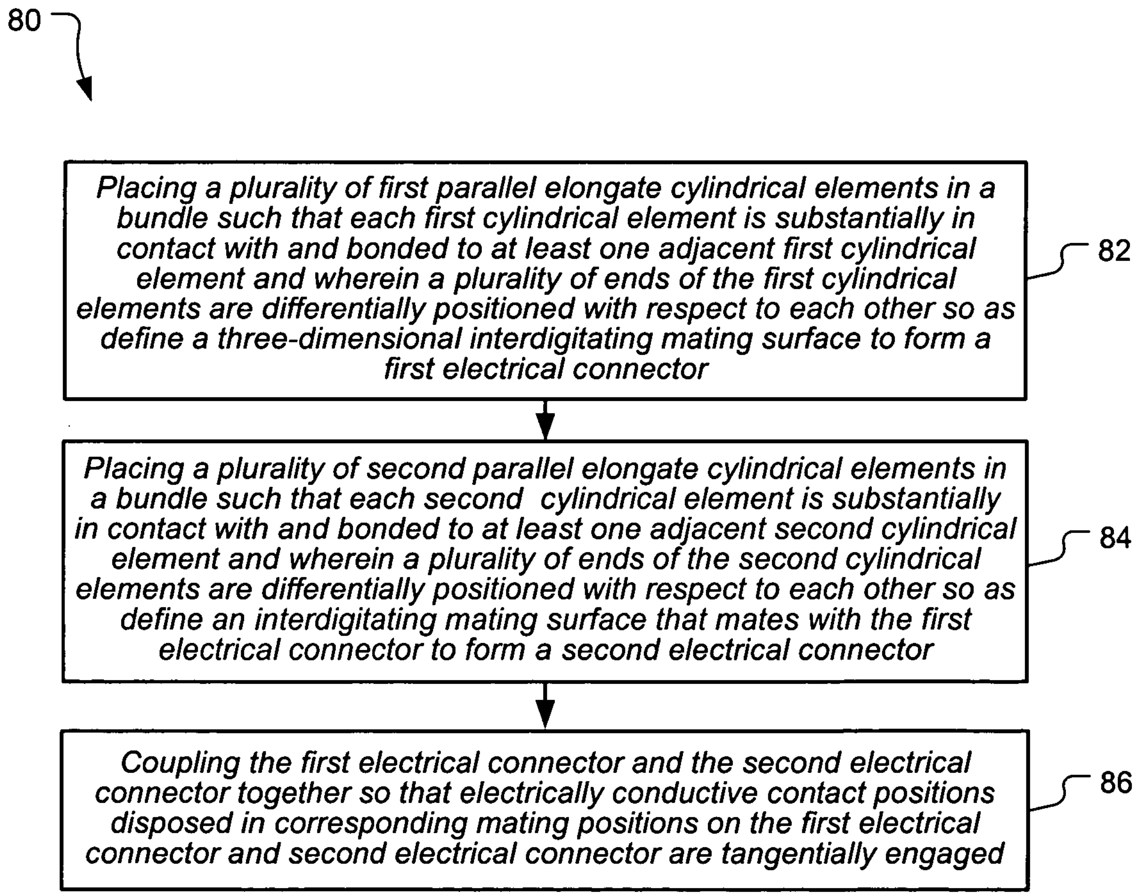
FIG. 8 illustrates a flow chart of an electrical interconnection method in accordance with an embodiment of the present invention.

An interconnection method will now be described. The interconnection method, shown generally at 80, is illustrated in flow chart form in FIG. 8 in accordance with an embodiment of the present invention. The method includes placing 82 a plurality of first parallel elongate cylindrical elements in a bundle to form a first connector. The method includes placing 84 a plurality of second parallel elongate cylindrical elements in a bundle to form a second connector. The first and second connector can be, for example, in the configurations described above, where the first connector and second electrical connector have complementary three-dimensional interdigitating surfaces so as to mate with each other. The method includes coupling 86 the first connector and second connector together so that electrically conductive contact positions disposed in corresponding mating positions on the first electrical connector and second electrical connector are tangentially engaged. For example, the electrical contacts can be arranged in the arrangements described above.

Because very small connectors can be formed using micro filaments, it may be helpful to use a fixture to plug the connectors together. Accordingly, the method 80 can include inserting the first and second electrical connectors into a mating fixture. The method 80 can further include clamping a sheath around the first connector and the second connector, for example, as described above.

Figure 9:
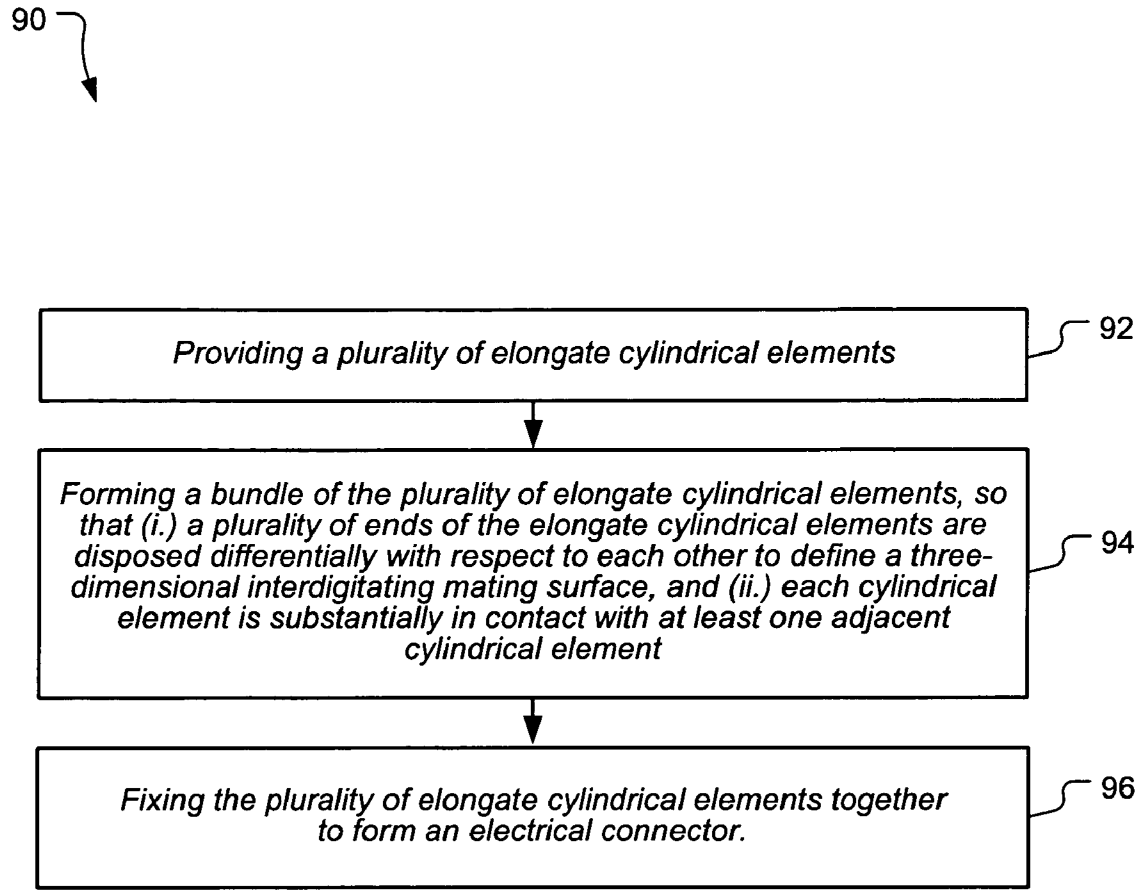
FIG. 9 illustrates a flow chart of a method of making an ultra-high density electrical connector in accordance with an embodiment of the present invention.

Finally, a method of making an ultra-high density connector will now be described. The method, shown generally at 90, is shown in flow diagram form in FIG. 9 in accordance with an embodiment of the present invention. The method includes providing 92 a plurality of elongate cylindrical elements. For example, the elongate cylindrical elements can be microwire cut from a spool of microwire. As another example, the elongate cylindrical elements can be glass fibers drawn or extruded from a blank or preform. The method also includes forming 94 a bundle of the plurality of elongate cylindrical elements. Each cylindrical element is substantially in contact with at least one adjacent cylindrical element.

In forming the bundle, ends of the elongate cylindrical elements are disposed differentially with respect to each other to define a three-dimensional interdigitating mating surface, as described above. For example, the bundle can be stacked up by placing a first elongate cylindrical element in a manufacturing jig, and then added elongate cylindrical elements on top of or along side of previously placed elongate cylindrical elements and sliding the elongate cylindrical elements along until a stop in the manufacturing jig is reached. The manufacturing jig can thus include a set of stops that define the three-dimensional interdigitating mating surface.

Alternately, the ends of the elongate cylindrical elements can initially be disposed in a common plane, and then the three-dimensional interdigitating mating surface defined by preferentially etching some of the elongate cylindrical elements. For example, cylindrical elements can be of different materials. As another example, etch-resist can be deposited on some of the cylindrical elements before forming of the bundle.

The method 90 also includes fixing 96 the plurality of elongate cylindrical elements together. For example, the cylindrical elements can be held together in a bundle by being bonded together or by being inserted inside a sleeve, ferule, or housing. For example, a bonding compound can be coated onto an outer surface of the elongate cylindrical elements before forming the bundle. Alternately, a bonding compound can be applied to the bundle after it is formed.

The method can include forming at least one electrically conductive region on an outer surface of at least one elongate cylindrical element. For example, electrically conductive regions can be formed using cylindrical lithography techniques as described in commonly-owned U.S. Pat. Nos. 5,106,455, 5,269,882, and 5,273,622 to Jacobsen et al., herein incorporated by reference. The conductive regions can be of various geometries, for example as discussed above. For example, multiple layers of conductive and/or insulating materials can be formed on the elongate cylindrical element to enable three-dimensional structures on the surface of the elongate cylindrical element to be formed.

Summarizing and reiterating to some extent, it can be appreciated from the foregoing that embodiments of the present invention can provide an ultra-high density connector having a number of benefits. An ultra-high density connector as taught herein can be used to provide various types of interfaces, including electrical, optical, and fluid. An ultra-high density connector can provide a large number of electrical circuit connections in a very small volume, providing orders of magnitude improvement in connection density over known molded pin and socket type connectors. By bonding the cylindrical elements together, for example by glue or epoxy, the need for a housing can be reduced, providing an even smaller connector. Microwires used for an interconnecting cable can be used as integral part of the connector, helping to improve reliability and reduce manufacturing cost. Examples of applications for ultra-high density connectors include interfacing to microscopic probe arrays, interfacing to electrical circuits, or similar applications.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present: a) "means for" or "step for" is expressly recited in that limitation; b) a corresponding function is expressly recited in that limitation; and c) structure, material or acts that support that function are described within the specification. Accordingly, the scope of the invention should be determined solely by the appended claims and their legal equivalents, rather than by the descriptions and examples given above.

The invention claimed is:

1. An ultra-high density connector comprising:

a bundle of substantially parallel elongate cylindrical elements, wherein each cylindrical element is substantially in contact with at least one adjacent cylindrical element; and at least two subsets of the elongate cylindrical elements having ends positioned substantially in a plane to form at least two subset end planes, wherein the at least two subset end planes are disposed differentially with respect to each other to define a three-dimensional surface configured to interdigitate with a mating connector, wherein at least one of the elongate cylindrical elements has an electrically conductive contact positioned to tangentially engage a corresponding electrical contact of the mating connector.

2. The ultra-high density connector of claim 1, wherein the at least two subsets further comprise three subsets having three subset end planes.

3. The ultra-high density connector of claim 1, wherein the elongate cylindrical elements have a cross section chosen from the group of shapes consisting of round, oval, triangular, square, rectangular, pentagonal, hexagonal, and polygonal.

4. The ultra-high density connector of claim 1, wherein at least one of the elongate cylindrical elements is chosen from the group of filamentary structures consisting of a microwire, an insulated microwire, and a glass fiber.

5. The ultra-high density connector of claim 1, wherein the elongate cylindrical elements have a cross-sectional diameter of less than about 200 micrometers.

6. The ultra-high density connector of claim 1, wherein at least one of the elongate cylindrical elements comprises a bonding material disposed on an outer surface of the elongate cylindrical element.

7. The ultra-high density connector of claim 1, wherein the elongate cylindrical elements are all substantially equal in cross section dimension.

8. The ultra-high density connector of claim 1, wherein the elongate cylindrical elements are arranged in a hexagonal close pack.

9. The ultra-high density connector of claim 1, wherein the electrically conductive contact comprises a patch of metal disposed on an outer surface of the corresponding elongate cylindrical element.

10. The ultra-high density connector of claim 1, wherein the electrically conductive contact comprises a conductive strip disposed on an outer surface of the corresponding elongate cylindrical element and extending along a length of the corresponding elongate cylindrical element.

11. The ultra-high density connector of claim 1, wherein the electrically conductive contact comprises a ring disposed substantially around an outer surface of the corresponding elongate cylindrical substrate.

12. The ultra-high density connector of claim 1, wherein at least one of the elongate cylindrical elements has an axial bore to communicate a fluid.

13. The ultra-high density connector of claim 1, wherein at least one of the elongate cylindrical elements is an optical fiber to communicate an optical signal.

14. The ultra-high density connector of claim 2, wherein the three subsets having three subset end planes further comprise a first subset configured for electrical communication, a second subset configured for optical communication, and a third subset configured for fluid communication.

15. A method of making an ultra-high density connector comprising:

a) providing a plurality of elongate cylindrical elements;

b) forming a bundle of the plurality of elongate cylindrical elements so that each cylindrical element is substantially in contact with at least one adjacent cylindrical element;

c) arranging the plurality of elongate cylindrical elements into at least two subsets of elongate cylindrical elements having at least two subset end planes, wherein the at least two subset end planes are disposed differentially with respect to each other to define a three-dimensional surface configured to interdigitate with a mating connector; and d) fixing the plurality of elongate cylindrical elements together to form a connector.

16. The method of claim 15, further comprising forming at least one electrically conductive region on an outer surface of at least one elongate cylindrical element.

17. The method of claim 16, wherein the at least one electrically conductive region is formed by cylindrical lithography.

18. The method of claim 15, wherein forming the bundle of the plurality of elongate cylindrical elements comprises:

placing the plurality of ends of the elongate cylindrical elements in a common plane, and etching a subset of the elongate cylindrical elements to form the three-dimensional mating surface.

19. The method of claim 15, wherein forming the bundle of the plurality of elongate cylindrical elements comprises sliding each elongate cylindrical element in a longitudinal direction and advancing the bundle until a stop in a manufacturing jig is reached.

20. The method of claim 15, wherein fixing the plurality of elongate cylindrical elements together comprises coating a bonding compound onto an outer surface of the plurality of elongate cylindrical elements before forming the bundle and curing the compound.

21. The method of claim 15, wherein fixing the plurality of elongate cylindrical elements together comprises applying a bonding compound to the bundle.

22. The method of claim 15, wherein fixing the plurality of elongate cylindrical elements together comprises inserting the bundle into a sleeve.

23. An interconnection method comprising:

a) placing a plurality of first parallel elongate cylindrical elements having at least one first cylindrical element with a tangentially-positioned electrically conductive contact in a bundle such that:

i) each first cylindrical element is substantially in contact with and bonded to at least one adjacent first cylindrical element; and ii) the plurality of first elongate cylindrical elements are arranged into at least two subsets of elongate cylindrical elements having at least two subset end planes, wherein the at least two subset end planes are differentially positioned with respect to each other so as to define a three-dimensional interdigitating mating surface to form a first connector;

b) placing a plurality of second parallel elongate cylindrical elements having at least one second cylindrical element with a tangentially-positioned electrically conductive contact in a bundle such that:

i) each second cylindrical element is substantially in contact with and bonded to at least one adjacent second cylindrical element; and ii) the plurality of second elongate cylindrical elements are arranged into at least two subsets of elongate cylindrical elements having at least two subset end planes, wherein the at least two subset end planes are differentially positioned with respect to each other so as define three-dimensional interdigitating mating surface to form a second connector that mates with the first electrical connector; and c) coupling the first connector and the second connector together so that the electrically conductive contact of the at least one first cylindrical element tangentially engages with the electrically conductive contact of the at least one second cylindrical element.

24. The method of claim 23 further comprising inserting the first connector and the second connector in a mating fixture.

25. The method of claim 23 further comprising clamping a sheath around the first connector and the second connector when coupled together.

* * * * *